United States Patent [19]

Morschl et al.

[11] 4,187,280

[45] Feb. 5, 1980

[54] PROCESS FOR RECOVERING USEABLE PRODUCTS FROM BY-PRODUCT AMMONIUM NITRATE FORMED IN THE MANUFACTURE OF NUCLEAR REACTOR FUELS OR BREEDER MATERIALS

[75] Inventors: Paul Morschl; Erich Zimmer, both of Jülich, Fed. Rep. of Germany

[73] Assignee: Kernforschungsanlage Jülich Gesellschaft mit beschränkter Haftung, Jülich, Fed. Rep. of Germany

[21] Appl. No.: 787,151

[22] Filed: Apr. 13, 1977

[30] Foreign Application Priority Data

Apr. 24, 1976 [DE] Fed. Rep. of Germany ....... 2617968

[51] Int. Cl.² .................... C01F 15/00; C01G 56/00
[52] U.S. Cl. .......................... 423/15; 423/11; 423/162; 423/194; 423/252; 423/253; 423/356; 423/357; 423/397
[58] Field of Search .............. 423/15, 18, 11, 20, 423/162, 194, 356, 357, 397, 19, 261, 252, 253

[56] References Cited

U.S. PATENT DOCUMENTS

| | | | |
|---|---|---|---|
| 2,801,155 | 7/1957 | Kippe | 423/162 |
| 3,000,698 | 9/1961 | Crowe | 423/15 |
| 3,338,667 | 8/1967 | Pundsack | 423/162 X |
| 3,372,999 | 3/1968 | Stevenson | 423/15 X |
| 3,394,997 | 7/1968 | Hollander | 423/15 X |
| 3,428,418 | 2/1969 | McFarlin et al. | 423/356 X |
| 3,781,216 | 12/1973 | Hackstein | 423/261 |

FOREIGN PATENT DOCUMENTS

334014 3/1921 Fed. Rep. of Germany ........... 423/162

OTHER PUBLICATIONS

*Comprehensive Inorganic Chemistry*, vol. 1, Pergamon Press, 1973, pp. 360, 472-473, 653.
Sienko, M. J. et al., *Chemistry*, 3rd Ed. 1966, McGraw-Hill, N.Y. pp. 519, 517.

*Primary Examiner*—Richard E. Schafer
*Attorney, Agent, or Firm*—Frishauf, Holtz, Goodman & Woodward

[57] ABSTRACT

Radiation-contaminated ammonium nitrate is heated in solution to about 100° C. in the presence of finely powdered calcium oxide or lithium hydroxide. Ammonia and water vapor are given off leaving an alkaline or alkaline earth nitrate which can then be safely decomposed by calcination into a metal oxide and oxides of nitrogen. The metal oxide can be recycled in a continuation of the process. The oxides of nitrogen can be passed through water to produce nitric acid useable in dissolving oxides of fissionable materials and the ammonia may be used in aqueous solution to react with nitrates of nuclear fuel or breeder metals in the very process that produces the by-product ammonium nitrate. Thus, all by-products and reagents can be reconverted and recycled.

4 Claims, No Drawings

PROCESS FOR RECOVERING USEABLE PRODUCTS FROM BY-PRODUCT AMMONIUM NITRATE FORMED IN THE MANUFACTURE OF NUCLEAR REACTOR FUELS OR BREEDER MATERIALS

This invention relates to a process for treatment of the by-product ammonium nitrate produced in the preparation of fuels and so-called breeder materials for nuclear reactors. The so-called fertile materials are isotopes that become transmuted into nuclear fuel by bombardment with neutrons such as occurs in a nuclear reactor.

In a variety of processes for producing nuclear fuels, ammonium nitrate is separated as a by-product. Thus, for example, according to the reactions set forth below in which solutions of uranyl nitrate or of thorium nitrate are treated with aqueous ammonia, the so-called "ammonium diuranate" or thorium hydroxide is precipitated and ammonium nitrate is formed.

$$2UO_2(NO_3)_2 + 6NH_4OH \rightarrow (NH_4)_2U_2O_7 \downarrow + 4NH_4NO_3 + 3H_2O$$

$$TH(NO_3)_4 + 4NH_4OH \rightarrow TH(OH)_4 \downarrow + 4NH_4NO_3$$

The precipitated uranium or thorium compounds are further treated to produce oxide fuel or breeder materials, such as are required for placement in nuclear power reactors. The ammonium nitrate formed as a by-product in the reactions above set forth is produced in radioactively contaminated form, so that any of the usual ways of utilizing the ammonium nitrate in industry, for example as a fertilizer, is out of the question. Even disposal of solutions containing this ammonium nitrate in waste water drains and conduits is not permissible because of the risk to the environment resulting from the radioactivity. In the usual decontamination of radioactively poisoned water by evaporation and condensation, the ammonium nitrate is a troublesome factor for the further treatment and solidification of the residue after distillation, because under certain circumstances it is inclined to decompose explosively and, at any rate, has oxidizing effect.

A treatment for the by-product ammonium nitrate from the production of nuclear fuels is known from German published patent application (OS) No. 1 921 181, in which the ammonium nitrate is thermally decomposed into water and nitrous oxide ($N_2O$), the latter being given off into the atmosphere. It is a disadvantage of this process, however, that some formation of poisonous nitrogen oxides takes place and, furthermore, the end products of the thermal decomposition are lost.

At page 2018 of the 1964 volume of "Chemistry and Industry", a process for treatment of ammonium nitrate is disclosed that consists of decomposing ammonium nitrate by the effect of aqua regia. Also in this case, a poisonous gas mixture is produced, that is likewise given off into the atmosphere. Another process is known from US Report Y-DA-5510 (1974) in which the ammonium nitrate is decomposed by biological denitrification. There is a disadvantage in this case, in addition to the slow reaction velocity, that anaerobic reaction conditions must be provided. All the known processes, moreover, have the disadvantage in common that the ammonium nitrate is broken down into decomposition products that have no further utility. In the case of the processes in which the ammonium nitrate is chemically decomposed, there is the further disadvantage of the continued using up of chemicals that must be procured for the process.

It is an object of the invention to provide a process for the treatment of by-product ammonium nitrate from the production of nuclear fuel and nuclear breeder materials in which the ammonium nitrate is decomposed in an economical manner without giving off dangerous waste products into the environment and from which products can be obtained, which are useful in the production processes for nuclear fuels.

SUMMARY OF THE INVENTION

Briefly, a basic metal oxide or metal hydroxide is added to the ammonium nitrate containing solution under heating to about 100° C. to give off ammonia gas in accordance with one of the following reactions $$2NH_4NO_3 + Me(OH)_2 \rightarrow Me(NO_3)_2 + 2NH_3 \uparrow + 2H_2O \uparrow$$

or $$2NH_4NO_3 + MeO \rightarrow Me(NO_3)_2 + 2NH_3 \uparrow + H_2O \uparrow$$

and the metal nitrate from which the ammonia gas is driven off is dried out of solution and decomposed by heat to form metal oxide and oxides of nitrogen, in accordance with the following formal reactions:

$$Me(NO_3)_2 \rightarrow MeO + 2NO_2 + \tfrac{1}{2}O_2$$

$$\tfrac{1}{2}O_2 + 2NO_2 \rightarrow N_2O_5$$

after which the oxides of nitrogen are further treated in already well-known ways to produce nitric acid. The nitric acid and ammonia can be used again in the production of nuclear fuel and the metal oxide can also be used again to treat the resulting ammonium nitrate, and so on.

The process according to the invention can be carried out without any danger. Ammonium nitrate, that is inclined to decompose explosively under strong heating, is converted to metal nitrate according to the invention at the relatively low temperature around 100° C., typically between 90° C. and 110° C., and the metal nitrate can be subjected to calcination at high temperature without any risk of explosion or other cause of damage. To all these advantages there is added the fact that the products obtained by carrying out the process according to the invention for the decomposition of the ammonium nitrate can be used for the production or further treatment of nuclear fuels or nuclear breeder materials and that the metal oxide used can be completely recycled. While the metal oxide formed as a decomposition product is used again for the decomposition of ammonium nitrate, the ammonia is used again in a simple way in the form of a water solution for the production of nuclear fuel or nuclear breeder materials as an agent for precipitating "ammonium diuranate" and/or thorium hydroxide. Even the nitric acid made from decomposition products is used for dissolving uranium oxide, for example for the reprocessing of irradiated nuclear fuels.

EXAMPLE

In a reaction vessel equipped with stirring means and heating means, 100 liters of an aqueous solution of ammonium nitrate having a concentration of 250 grams per liter or 3.12 moles per liter are provided as contents. 9.63 kg of finely powdered calcium oxide (0.55 moles per mole of NH$_4$NO$_3$) are added to this solution gradually during intensive stirring. The suspension so obtained is then heated to boiling within a few minutes likewise during heavy stirring, and ammonia is evaporated off together with water vapor. After 25 to 30 minutes, ammonia is set free from the solution with a quantitative yield of 99.96% of the theoretical value.

The ammonia is dissolved in water and the approximately 6 molar solution obtained in this way is preserved in a collecting container. The calcium nitrate solution thus formed that contains a small quantity of suspended calcium hydroxide is concentrated by evaporation until the beginning of precipitation. The temperature of the boiling solution rises during this stage to 150° C. The hot melt is then treated by spray drying for removal of the remaining water ($\approx$2.5 mol. H$_2$O/mol. calcium nitrate). The dehydrated calcium nitrate is then subjected to spray calcination and thereby thermally decomposed to calcium oxide and oxides of nitrogen at 750° C. within a few seconds. The finely divided calcium oxide is withdrawn from the reactor and supplied to the reaction vessel for the previously described reaction with aqueous ammonium nitrate solution. The oxides of nitrogen are treated by passing through water to produce nitric acid.

Instead of calcium oxide or calcium hydroxide, of course, another metal oxide or hydroxide forming a strong base, as for example lithium hydroxide can be used. In general, alkaline oxides and alkaline earth oxides can be used, those preferred being naturally those that are more readily available and not unduly costly, and the most corrosive oxides and hydroxides such as those of sodium and potassium are less preferred because of the inconvenience of handling them.

We claim:

1. A method for the treatment of by-product ammonium nitrate produced in the production of nuclear fuels and breeder materials enabling recovery and recycling of nitrogen in usable form derived both from the ammonia component and from the nitrate component of the ammonium nitrate and thereby usefully recovering substantially all the nitrogen thereof, comprising the steps of:

a. heating an aqueous solution containing said by-product ammonium nitrate to a temperature between 90° C. and 110° C.;
   b. adding an oxide or hydroxide of an alkali or alkaline earth metal to said heated aqueous solution to initiate one of the following reactions:

$$2NH_4NO_3 + Me(OH)_2 \rightarrow Me(NO_3)_2 + 2NH_3 + 2H_2O,$$

$$2NH_4NO_3 + MeO \rightarrow Me(NO_3)_2 + 2NH_3 + H_2O,$$

$$NH_4NO_3 + Me(OH) \rightarrow MeNO_3 + NH_3 + H_2O,$$

$$2NH_4NO_3 + Me_2O \rightarrow 2MeNO_3 + 2NH_3 + 2H_2O,$$

where Me represents the alkali or alkaline earth metal;
   c. recovering the ammonia gas vaporized during the above reactions;
   d. drying the metal nitrate solution obtained in step b to recover the metal nitrate in solid form;
   e. heating the metal nitrate to decompose the compound into the respective metal oxides and oxides of nitrogen according to the equations:

$$Me(NO_3)_2 \rightarrow MeO + 2NO_2 + \tfrac{1}{2}O_2,$$

$$2MeNO_3 \rightarrow Me_2O + 2NO_2 + \tfrac{1}{2}O_2,$$

$$\tfrac{1}{2}O_2 + 2NO_2 \rightarrow N_2O_5;$$

f. treating the oxides of nitrogen to produce nitric acid;
   g. utilizing the metal oxides formed in step e as an oxide additive in step b to form metal nitrate and ammonia;
   h. dissolving the ammonia recovered in step c in water to form ammonia hydroxide solution;
   i. adding a compound selected from UO$_2$(NO$_3$)$_2$ and Th(NO$_3$)$_4$ to the solution formed in step h to produce (NH$_4$)$_2$U$_2$O$_7$ and Th(OH$_4$), respectively, according to the following reactions:

$$2UO_2(NO_3)_2 + 6NH_4OH \rightarrow (NH_4)_2U_2O_7 + 4NH_4NO_3 + 3H_2O,$$

$$Th(NO_3)_4 + 4NH_4OH \rightarrow Th(OH)_4 + 4NH_4NO_3;$$

j. utilizing the nitric acid formed in step f for dissolving an oxide of a fissionable metal from irradiated nuclear fuel.

2. A process according to claim 1, in which step a is performed by heating the aqueous solution to a temperature of about 100° C. and step b is carried out also at a temperature of about 100° C.

3. A process according to claim 1, in which the oxide or hydroxide added in step b is calcium oxide.

4. A process according to claim 1, in which the oxide or hydroxide added in step b is lithium hydroxide.

* * * * *